G. B. AMUNDSEN.
FRICTION DRIVER FOR LATHES AND GRINDERS.
APPLICATION FILED MAY 16, 1919.

1,336,548. Patented Apr. 13, 1920.

Inventor:
G. B. Amundsen
J. H. Gibbs, Atty.

UNITED STATES PATENT OFFICE.

GODFREY B. AMUNDSEN, OF CHICAGO, ILLINOIS, ASSIGNOR TO AMERICAN CAR AND FOUNDRY COMPANY, OF NEW YORK, N. Y., A CORPORATION OF NEW JERSEY.

FRICTION-DRIVER FOR LATHES AND GRINDERS.

1,336,548.    Specification of Letters Patent.   Patented Apr. 13, 1920.

Application filed May 16, 1919. Serial No. 297,714.

*To all whom it may concern:*

Be it known that I, GODFREY B. AMUNDSEN, residing at Chicago, county of Cook, State of Illinois, and being a citizen of the United States, have invented certain new and useful Improvements in Friction-Drivers for Lathes and Grinders, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

Figure 1:
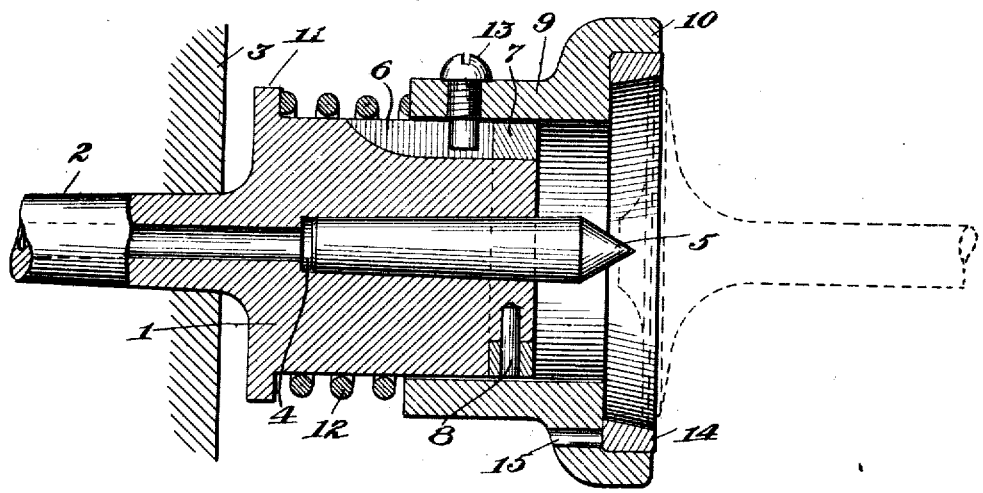
Figure 1 is a central longitudinal section of my device.
Figure 2:
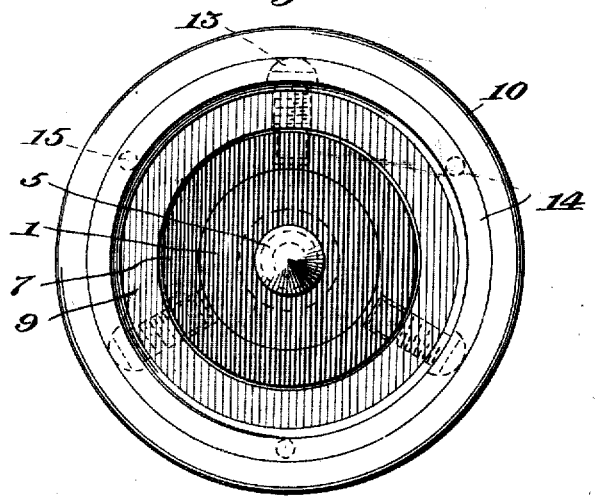
Fig. 2 is an end elevation.

This invention relates to drivers for holding and driving the work on lathes and grinders and it is the object of my invention to provide a device that may be fitted to the headstock of the machine and that may be quickly engaged with or disengaged from the work and that will properly drive the work.

It is to be understood that the invention is not limited to the exact details of construction shown and described, as it is obvious that various modifications thereof within the scope of the claims will occur to persons skilled in the art.

Referring to the drawings, 1 designates a spindle provided with a shank 2 for engagement with the machine head spindle 3. The spindle 1 is provided with a central longitudinal bore 4, enlarged at one end, so as to receive the usual tapered center 5. It is also provided with slots 6 in its outer surface and with an annular recess in which is fitted a collar 7 that is secured in place by pins 8 and which serves to close the outer ends of the slots 6.

Fitting loosely on the spindle 1 is a sleeve 9, the internal diameter of which is slightly greater than the diameter of the spindle so as to permit of a slight play of the sleeve on the spindle. The outer end of the sleeve is enlarged and provided with an outwardly extending flange 10. Secured between the inner end of the sleeve 9 and a flange 11 on the spindle 1, is a spiral spring 12 which encircles the spindle 1 and serves to force the sleeve 9 outwardly. Screws 13 in openings in the sleeve 9 and traveling in the slots 6 of the spindle 1, engage the collar 7 which closes the ends of the slots 6 and limit the outward movement of the sleeve 9.

Engaging the inside of the flange 10 and the outer end of the sleeve 9 and driven by frictional engagement therewith is a friction ring 14, the inner surface of the ring having the shape of a frustum of a cone with the lesser diameter adjacent the outer end of the sleeve. This enables a ring to care for work of slightly different diameters and to frictionally drive the work, the work being positioned as indicated in dotted lines in Fig. 1. Rings of different internal diameters may be made to fit the one sleeve, making a change of the friction ring all that is necessary in order that the driver may accommodate work of any diameter within the capacity of the sleeve. Small holes 15 are drilled through the outer end of the sleeve to provide for the removal of dirt and grit that would interfere with the proper seating of the ring 14 and permit of the insertion of a punch to aid in the removal of the ring 14.

In practice, the play of the sleeve on the spindle permits the work which engages the friction ring to automatically center itself on the center 5 and the spring, while serving as a means for keeping the friction ring in driving engagement with the work, permits of the work properly engaging centers that have become shortened through regrinding and wear. The frictional engagement of ring 14 and sleeve 9 and of ring 14 and the work permits of the ring 14 turning in the sleeve 9 or of the work turning in ring 14 in case too heavy a cut is taken or the work is caught by the tool and thus acts to protect both the work and the tool. The position of the spring on the outside of the spindle leaves it open for constant inspection and keeps it from becoming filled with dirt when the driver is used on grinding machines.

What I claim is:

1. The combination of a spindle, a sleeve carried by said spindle, a work-engaging and driving ring carried by said sleeve and yielding means for forcing said ring into engagement with the work.

2. The combination of a spindle, a sleeve carried by said spindle, a work-engaging and driving ring carried by said sleeve and a spring engaging said spindle and said sleeve for forcing said ring into driving engagement with the work.

3. The combination of a spindle, a sleeve engaging said spindle, means carried by said sleeve for driving the work and means carried by said spindle for forcing said work-driving means into engagement with the work.

4. The combination of a spindle, a sleeve engaging said spindle, means carried by said sleeve for driving the work and yielding means for forcing said work-driving means into driving engagement with the work.

5. The combination of a spindle, a sleeve engaging said spindle and frictional work-driving means frictionally driven by said sleeve.

6. The combination of a spindle, a sleeve engaging said spindle, frictional work-driving means frictionally driven by said sleeve and means for forcing the work-driving means into engagement with the work.

7. The combination of a spindle, a sleeve engaging said spindle, work-engaging means frictionally driven by said sleeve and yielding means for forcing said work-engaging means into engagement with the work.

8. The combination of a spindle, a sleeve engaging said spindle, frictional work-driving means frictionally driven by said sleeve and yielding means for forcing said work-engaging means into engagement with the work.

9. The combination of a spindle, a sleeve carried by said spindle and a work engaging ring carried by said sleeve and adapted to travel in said sleeve when subjected to undue stress.

10. The combination of a spindle, a sleeve carried by said spindle and a work engaging ring carried by said sleeve and adapted to permit the work to travel therein when subjected to undue stress.

11. The combination of a spindle, a sleeve carried by said spindle and a work driving ring carried by said sleeve and having a driving engagement with said sleeve adapted to yield under undue stress.

12. The combination of a spindle, a sleeve carried by said spindle and a work driving ring carried by said sleeve having a driving engagement with the work adapted to yield under undue stress.

13. The combination of a spindle, a sleeve carried by said spindle and a work driving ring carried by said sleeve, the connections between said ring and said sleeve and work being adapted to yield under undue stress.

14. The combination of a spindle, a sleeve carried by said spindle, a closed work engaging ring carried by said sleeve and adapted to frictionally drive the work.

15. The combination of a spindle, a closed sleeve carried by said spindle, and a closed work engaging ring fitted to said sleeve and having a tapering work-engaging opening and adapted to frictionally drive the work.

16. The combination of a spindle, a closed sleeve carried by said spindle, a closed work engaging ring fitted to said sleeve and adapted to frictionally drive said work and resilient means adapted to force said ring into engagement with the work.

17. The combination of a spindle, a closed sleeve carried by said spindle, a closed work engaging ring having a tapering work engaging opening fitted to said sleeve and adapted to frictionally drive the work and resilient means engaging said spindle and sleeve and adapted to force said ring into engagement with the work.

In witness whereof I have hereunto set my hand in the presence of two witnesses.

GODFREY B. AMUNDSEN.

Witnesses:
A. T. HUGHES,
J. B. BEEBER.